C. M. JOHNSON.

PEN AND PENCIL CASE.

No. 7,538. Reissued Feb. 27, 1877.

Witnesses:

C. R. Le Count.

M. Higgins

Inventor:

C. M. Johnson per Chas. M. Higgins

Attorney

UNITED STATES PATENT OFFICE.

CAMILLUS M. JOHNSON, OF NEW YORK, N. Y.

IMPROVEMENT IN PEN AND PENCIL CASES.

Specification forming part of Letters Patent No. 181,447, dated August 22, 1876; reissue No. 7,538, dated February 27, 1877; application filed January 18, 1877.

*To all whom it may concern:*

Be it known that I, CAMILLUS M. JOHNSON, of New York city, have invented certain new and useful Improvements in Combination Pen and Pencil Cases, of which the following is a specification:

Pen and pencil cases, as heretofore constructed, in some instances combining a knife, have been chiefly of a complicated nature, designed for construction in gold or silver, and hence making expensive instruments, which were not adapted for common use. The object of my invention, however, is to furnish a combination instrument, which from its simple construction, low price, and general utility, shall be adapted to common and general use, and form a popular article suited for extensive sale; and the invention consists in the special construction of the parts, and in the particular and general arrangement of the combined instruments, as hereinafter set forth.

Figure 1:
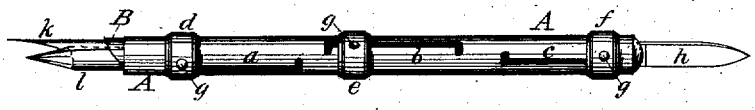
Figure 2:
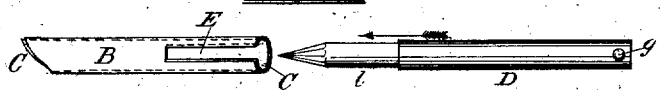

Referring to the adjoined drawings, Fig. 1 is a view of the implement entire, with the various instruments projecting from the case. Fig. 2 is a view of the pen and pencil portion separated, and Fig. 3 is an enlarged transverse section of the same.

From these views it will be seen that the device combines a pen, pencil, and knife. A indicates the handle or case of the implement, which is tubular and open at each end, and is preferably constructed of thin brass plated with nickel. Within the case, and arranged to slide therefrom, are the several instruments before mentioned, the knife *h* being arranged in one end of the case, and the pen *k* and pencil *l* in the other, each end of the case being thus utilized, so that from one end thereof may be slid a pencil or pen, and from the opposite end may be slid a knife. These instruments are slid out of or into the case, as required, by bands *d e f* encircling the outer case, and connected through the slots *a b c* with the instruments within by small screw-pins *g g*, which project through, and move in, the slots, the slots terminating at each end in lateral notches, into which the pin may be turned to lock the instrument in required positions.

Figure 3:
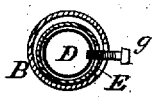

As seen in Fig. 1, the pen and pencil holders are arranged so that the latter slides directly within the former, and these parts, in which perhaps the chief novelty consists, are shown in detail in Figs. 2 and 3. The part forming the pen-holder is shown at B, and consists of a sleeve or short tube, shaped at one end like an ordinary holder, and formed to snugly fit and slide within the case A. Within the sleeve B is a springy lining or inner casing, C, between which and the outer part B the pen or nib *k* is held, as usual in holders; but, unlike the ordinary holder, this inner part C extends the whole length of the sleeve B, so as to form a uniform bearing and guide for the pencil-holder D, which slides directly within and in contact with the interior of the said holder B C, and is guided and supported thereby.

I am, of course, aware that pencil-cases, in which the pencil and pen are arranged concentrically, or one within the other, are common; but in these cases it will be found that the pencil slides within a separate tube fixed rigidly between itself and the pen-holder, and not directly within an inclosing pen-holder, which forms of itself the bearing and guide therefor, as in my invention, and which conduces to the desired simplicity, compactness, and cheapness of structure.

The pencil-holder D, as shown in Fig. 2, consists of a short slender tube adapted to receive, as within a sheath, a section of common pencil. The pencil, which snugly fits the sheath or socket D, is held therein by simple friction, and may be drawn farther out as used or replaced by a new section when entirely worn out, and while this is simple and cheap it has the advantage besides of being better adapted to the general public, who are more familiar with and generally prefer the use of the common pencil.

A slot or opening, E, Figs. 2 and 3, extends up one side of the pen-holder B C, the purpose of which, as will be understood, is to allow the little screw-pin *g* connected with the band *e* which actuates the pencil-holder D to extend through and connect therewith, as seen in Fig. 3, and at the same time permit the external pen-holder B C and internal pencil-holder D to slide on each other without their movements interfering, so that either instrument can be slid in or out separately and independently of the other.

If desired, a tooth-pick may be arranged to slide alongside the knife, or the positions of the knife and pencil may be reversed; but the combination and arranged shown is preferred.

By this compact arrangement and simple construction I thus combine in one convenient implement a number of instruments of the most common utility, and am enabled to readily sell the complete article for the small sum of twenty-five cents, thus attaining the object of the invention.

What I claim as my invention is as follows:

1. In a pen or pencil case, I claim the combination, together with the outer case A and operating bands *d e*, of the pencil-holder D, combined with the pen-holder B, in such a way that the former is arranged to slide directly within and in contact with the latter, which forms its bearing and guide, substantially as herein shown and described.

2. The combination, with the slotted tubular case A, open at each end, and operating bands *d e f*, of the knife *h*, arranged to slide out of one end of the case, together with a pen- or pencil holder, B D, arranged to slide from the opposite end of the case, substantially as herein set forth.

3. In combination with the slotted case A, the pen-holder B, provided with the inner lining C, in combination with the pencil-holder D, arranged to slide within it, substantially as shown and described.

4. In combination with the slotted case A and operating pins *g*, and with the pencil-holder D, arranged to slide within the pen-holder, the pen-holder B, provided with the slot or opening E, substantially as and for the purpose set forth.

In witness whereof I have hereunto signed my name in the presence of two subscribing witnesses.

CAMILLUS M. JOHNSON

Witnesses:

JAMES R. ADAMS,
CHAS. M. HIGGINS.